United States Patent [19]
Marsh et al.

[11] 3,849,245
[45] Nov. 19, 1974

[54] SEPARATION OF GREASY LIQUIDS AND RECOVERY OF PAPER FIBER FROM MUNICIPAL REFUSE

[75] Inventors: Paul G. Marsh; David E. Chupka, both of Middletown, Ohio

[73] Assignee: Black Clawson Fibreclaim, Inc., Middletown, Ohio

[22] Filed: Nov. 13, 1973

[21] Appl. No.: 415,301

Related U.S. Application Data

[63] Continuation-in-part of Ser. No. 224,815, Feb. 9, 1972, abandoned.

[52] U.S. Cl. .................... 162/4, 162/57, 162/189, 210/84
[51] Int. Cl. .................... D21f 1/66, B01d 21/26
[58] Field of Search ............... 162/4, 5, 6, 7, 8, 55, 162/57, 58, 147, 172, 173, 189; 209/211; 210/84, 59; 8/139, 141; 241/15, 21, 28

[56] References Cited
UNITED STATES PATENTS

| | | | |
|---|---|---|---|
| 2,360,551 | 10/1944 | Durdin | 210/84 X |
| 2,364,405 | 12/1944 | Trimbey et al. | 210/84 X |
| 3,549,092 | 12/1970 | Baxter, Jr. | 241/15 |
| 3,557,956 | 1/1971 | Braun et al. | 162/4 X |
| 3,595,488 | 7/1971 | Blakely et al. | 241/21 |
| 3,597,308 | 8/1971 | Brooks | 162/4 |
| 3,615,014 | 10/1971 | Hruby | 209/211 |
| 3,714,038 | 1/1973 | Marsh | 210/59 |
| 3,736,223 | 5/1973 | Marsh | 162/4 |

FOREIGN PATENTS OR APPLICATIONS
1,206,550 9/1970 Great Britain .......................... 162/4

Primary Examiner—S. Leon Bashore
Assistant Examiner—Richard V. Fisher
Attorney, Agent, or Firm—Biebel, French & Bugg

[57] ABSTRACT

In a method of recovering reusable papermaking fibers from municipal refuse containing substantial quantities of garbage and other organic waste, a slurry consisting essentially of cellulose fibers contaminated by grease is subjected to a centrifugal flotation treatment for separating the cellulose fibers from the other solid materials in a conical vessel having a tangential inlet port and outlet ports at its apex and base, the supply flow and pressure to the vessel being maintained sufficiently high and the discharge flows through the outlet ports being controlled to effect discharge of substantial volumetric flows through both outlet ports under pressure drop conditions equal to or higher than those used in conventional centrifugal cleaning operations in a vortex separator of comparable size. The discharge flow through the apex port contains a large majority of the fibers of good paper making quality, while the discharge flow through the base outlet contains the majority of the reject material, the most significant proportion of which is solvent-soluble grease and/or wax capable of separate recovery therefrom, the remainder being largely plastic and paper fiber fines.

15 Claims, 2 Drawing Figures

PATENTED NOV 19 1974 3,849,245

SEPARATION OF GREASY LIQUIDS AND RECOVERY OF PAPER FIBER FROM MUNICIPAL REFUSE

CROSS REFERENCE TO RELATED APPLICATION

This application is a continuation-in-part of our application Ser. No. 224,815 filed Feb. 9, 1972 now abandoned.

BACKGROUND OF THE INVENTION

Substantial research and development work has been done by the present applicants and coworkers on behalf of the same assignee with the objective of recovering reusable paper making fibers from heterogeneous municipal solid waste. The impetus for this program has derived in part from increasing and impending shortages of virgin fiber and a great increase in the proportion of paper as a constituent of municipal waste, a proportion which is now approaching or surpassing 50 percent. Among a number of patents already issued in this field to applicants' assignee, Marsh U.S. Pat. No. 3,736,223 is of particular interest as describing a system and process for treating municipal waste to recover reusable paper making fibers therefrom.

Municipal solid waste generally contains materials of highly disparate character, including glass, metals, animal and food wastes, vegetation, dirt, plastics, a large proportion of paper and paperboard, and other fibrous and fiber-like materials such as textiles composed of both natural and synthetic fibers. Municipal waste therefore presents significantly different reclamation problems from the "waste paper" commodity which has been conventionally utilized as a source of secondary fiber by many paper mills for the production of box-board and other relatively low quality paper products.

Commercial "waste paper" normally comprises sorted and baled papers which are relatively clean in comparison with the contents of municipal trash-collecting trucks, and they are frequently pre-sorted into categories such as newspaper, magazines, and used cartons and other packaging materials. "Waste paper" can therefore be successfully cleaned by conventional equipment such particularly as centrifugal cleaners and mechanical screens, the most specialized problem in this area being the elimination of inks and pigments which constitutes the art of "de-inking" with which the industry has been familiar for many years.

A comparatively recent development in the field of commercial waste paper recovery, and having particular applicability to de-inking, is described in two patents issued to Bergstrom Paper Company, Braun et al. U.S. Pat. No. 3,557,956 and British patent 1,206,550. The British patent is particularly concerned with the elimination of certain contaminants indigenous to commercial waste paper, namely ink pepper, clays, pigment fillers, and resinous materials used in coating, printing, laminating and binding. This patent teaches a technique which it calls "reverse" centrifugal cleaning in a cyclone separator wherein the apex outlet is of the same flow area as the base outlet which is commonly considered as the accepts outlet, and the fraction of the feed discharged through the apex outlet becomes the accepts while the contaminants exit with the other fraction through the base outlet commonly used for accepts in conventional centrifugal cleaning.

Braun et al. U.S. Pat. No. 3,557,976 describes an improvement over the deinking technique of the British patent involving the addition to the feed slurry of a fluid which is selectively attracted to heavy contaminants normally discharged through the apex outlet of a centrifugal cleaner and which makes such contaminants act as if they are of lower specific gravity and therefore exit through the base outlet, the examples of such auxiliary fluid being air and kerosene.

The heterogeneous character of municipal waste, as contrasted with commercial waste paper, gives rise to special cleaning and screening problems. The process and system described in the above noted patent are generally successful in separating the paper making fibrous constituents of municipal waste from water soluble contaminants, and also in removing the solid contaminants which differ in particle size from paper fibers or which have specific gravities higher than the fibers, such separation being readily accomplished by screening and by gravity and centrifugal cleaning in equipment conventionally used for such purposes. There is one cleaning problem, however, which is unique to the reclamation of paper making fibers from municipal waste. It involves a special category of contaminants unique to municipal waste which are most difficult to separate effectively from the fibers, and this category comprises oils and greases, namely liquids as contrasted with solid particulate materials.

The term "grease" will be used hereinafter to designate any of the many oily or greasy materials which may appear in municipal solid waste. More specifically, animal and vegetable fats are inevitably present in garbage, typical common examples being butter, oleomargarine, cooking fats and oils, and waste animal fats from bacon and other meats. Similarly waste petroleum products occur in considerable profusion in household trash and especially in industrial waste. Any such grease is not only a contaminant per se if present among paper making fibers, but is further undesirable because it has a tendency to attach itself to low specific gravity solid contaminants in fine particle form, such as dirt, ink, asphalt and the like, thereby causing them to be retained on the fibers.

Grease occurs in substantial quantities in municipal solid waste, primarily as a constituent of household, institutional and industrial waste, ranging as high as 5 percent or 100 pounds per ton. It constitutes a serious obstacle to the production of good quality paper fibers from such wastes, primarily because when a slurry containing grease and paper fibers is subjected to normal cleaning or screening treatment, the grease does not respond to the separating forces in the same manner as solid particles and thus resists separation from the paper fibers. Grease seriously detracts from the value of paper made from fibers reclaimed from municipal waste, because it shows up as spots in the surface of the paper which respond differently to bleaching or dying as compared with grease-free paper.

SUMMARY OF THE INVENTION

It is the major objective of this invention to effect separation of contaminant grease from good quality paper making fibers salvaged from municipal solid waste.

In the practice of the invention, solid waste materials are initially treated as described in the above noted Marsh patent by mixture with water in a treatment vessel where the resulting slurry is subjected to mechanical and hydraulic shear forces to reduce the relatively frangible portions of the solids to a maximum predetermined particle size. Apparatus which has been found particularly suitable for this purpose is disclosed in our patent with Blakley et al. U.S. Pat. No. 3,595,488, and the pulpable slurry extracted from that apparatus is subjected to sufficient screening and/or other cleaning to effect substantial removal of the remaining particles of inorganic materials.

The solids remaining in the slurry which has been subjected to these steps will comprise primarily paper making fibers, possibly together with some various types of other low specific gravity organic particles such, for example, as wax, vegetable and meat particles, hair, synthetic fibers, threads, and vegetation residue such as fragments of grass clippings and leaves. These other particles, however, are of secondary importance in contrast with the fact that the slurry will also usually contain a substantial quantity of grease, both in the form of small liquid globules, which may or may not have attracted tiny particles of ink, dye or other solids, and also as liquid adsorbed on or impregnating some of the paper fibers.

The key to accomplishment of the objective outlined above has been supplied by discovery of the unexpected result that a centrifugal treatment similar to the "reverse" centrifugal cleaning described in the above British patent — but which is more appropriately termed "centrifugal flotation" — is highly effective in separating liquid greases from a grease-contaminated slurry of paper making fibers. Further, this treatment offers as a dividend the substantial elimination of whatever low specific gravity fine particles may have remained in the slurry after the cleaning and screening steps described in the Marsh patent.

In carrying out this treatment, the slurry is directed through a tangential inlet port into a vessel of conical shape which is also provided in its apex and base with outlet ports as in a conventional centrifugal separator. The tangential inflow establishes a vortical flow pattern in the vessel about the axis thereof which results in separating the non-aqueous materials within the vessel into two major fractions. The outer fraction will contain the large majority of the papermaking fibers, while the inner fraction will contain the major portion of the grease, as well as a large majority of the lights category of contaminants.

The conical vessel in which this separation is effected differs in structure and mode of operation from conventional centrifugal cleaners, in which the outlet port from the base of the cone is commonly of approximately the same size as the inlet port, but the outlet port from the apex of the cone is so restricted that discharge therefrom is limited to a relatively minor volume (less than 5 percent) of the inlet flow, a division of outlet flows which is quite satisfactory when the purpose is to remove gritty contaminants from otherwise relatively clean paper fibers. For the purposes of the invention, however, such flow division would produce no useful results, because the majority of the paper fibers and grease would discharge with the light contaminant particles through the base outlet port.

In practicing the present invention, the apex outlet port is of substantially greater size than in a conventional cleaner, and the infeed pressure and supply flow are maintained sufficiently high to cause discharge through both outlet ports at substantial volumetric rates and with a pressure drop equal to or substantially higher than that used for conventional operations. Under these conditions, most of the paper-making fibers will discharge through the apex port with the outer fraction into which the slurry is separated within the vessel, but the greasy liquid contaminants will largely discharge with the inner fraction through the port in the base of the vessel which is the accepts port in conventional centrifugal cleaning operations.

While the invention is primarily concerned with separation of greasy contaminant liquids from paper making fibers, the centrifugal flotation process for this purpose may be combined with other treatment steps. For example, the slurry may be treated to loosen the grease constituent from the paper fibers prior to the centrifugal flotation step, which may be done chemically, by treatment with a dispersing agent or grease remover such as soap or detergent, or mechanically by apparatus such as a disk refiner or deflaker.

Since the fraction of the slurry containing the paper fibers is treated as the heavier fraction for centrifugal flotation purposes, any contaminant particles of a gritty nature, which are of higher specific gravity than water, will remain with the paper fibers. They may then be readily eliminated by a further cleaning step of conventional nature in a centrifugal cleaner. Other treatments to which the paper fiber may be subjected to increase its quality include digestion and bleaching following the flotation and other cleaning steps.

The invention also offers further advantages by way of the by-products it provides in addition to the reclaimed fiber. In particular, the reject from the centrifugal flotation unit has so high a content of solvent-soluble grease and wax as to make it practical to separate that component from the balance of the reject. In addition, the remaining reject material is so largely organic in nature as to be suitable as raw material for conversion to fuel, whether or not the grease and wax are first removed.

DESCRIPTION OF THE PREFERRED EMBODIMENTS

Figure 1:
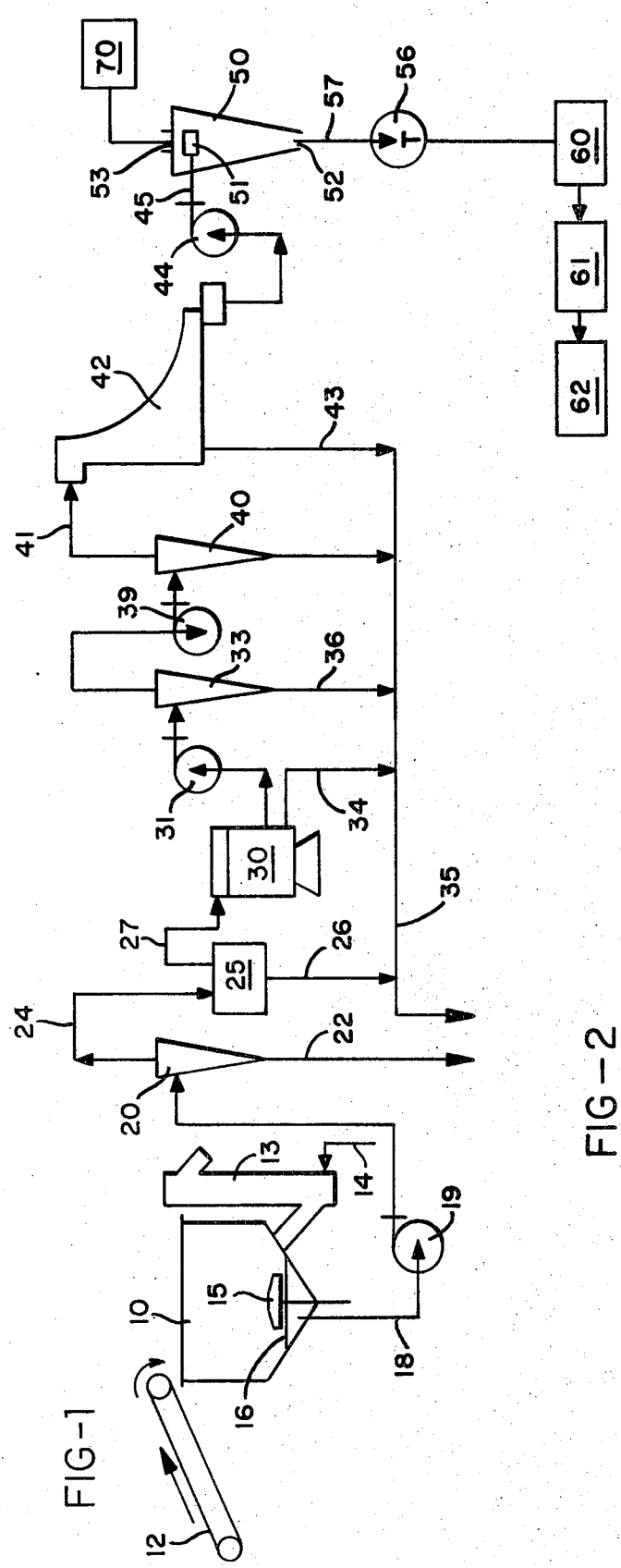
FIG. 1 shows somewhat schematically a complete system for performing the invention.

The system shown in FIG. 1 includes a waste treatment tub 10 to which solid waste materials may be fed by any suitable means, such as a conveyor 12. A junk remover 13 communicates with tub 10 for removing relatively infrangible materials therefrom, and an aqueous medium, such as water, may be fed into the tub through the junk remover 13 by means of the line 14.

All of the above equipment may be of the type more fully described in U.S. Pat. No. 3,549,092, with the pulper preferably being of the characteristics shown in U.S. Pat. No. 3,595,488. As described in detail in those patents, a rotor 15 is provided in tub 10 which establishes a vortical flow pattern and subjects the solid waste material in the tub to violent hydraulic and mechanical shear forces, thereby reducing relatively frangible portions of the solids to a predetermined size for extraction through an extraction 16 in the bottom of the tub having perforations in the range of ½ to 1 ½ inches in diameter.

A slurry, consisting of a portion of the aqueous medium and relatively frangible solid waste materials reduced to a size sufficiently small to pass through the extraction plate 16, is removed by means of line 18 and pumped by pump 19 to a centrifugal cleaner or liquid cyclone 20 of relatively large size and capacity. This slurry is fed tangentially into cleaner 20, and most of the gritty inorganics are removed in conventional fashion through the apex of the cleaner, as indicated by the arrow 22.

The remainder of the slurry, constituting approximately 99 percent of the total volume and about 85 percent of the solids fed into the cleaner 20, passes out of the top of the cleaner by means of the line 24 and is directed to suitable screening apparatus 25, preferably relatively coarse in nature, for example, having screen perforations ⅛ inch in diameter. Reject materials removed from the slurry in the screen 25 are removed through a line 26, and the accepts are directed through line 27 to a relatively fine screen 30 for additional screening, for example through perforations 1/16 inch in diameter.

The accepts from the fine screen 30 are shown as supplied by pump 31 to further cleaning means, represented by a centrifugal cleaner 33, while the rejects from screen 30 pass through a line 34 to the reject disposal line 35, and the rejects from cleaner 33 are similarly directed to line 35 by a line 36. Because in most instances the accepted stock from cleaner 33 will still contain an appreciable quantity of fine particles of organic dirt, it is preferable that it be subjected to a further cleaning operation at this state, which is represented by a pump 39 and centrifugal cleaner 40. Preferably the cleaner 40 will be operated to effect finer cleaning than the cleaner 33, for example by diluting the stock to a consistency of the order of 0.3 percent as compared with 0.7 percent for the cleaner 33, and/or by using a 6-inch cleaner 33 and a 3-inch cleaner 40. The accepted stock from cleaner 40 is delivered by a line 41 to a fines remover 42, shown as an inclined type of screen from which the rejected fines are supplied by a line 43 to the main reject line 35.

The solids in the accepted stock from fines remover 42 consist of paper fibers contaminated primarily by grease of the wide variety of types common in municipal waste. It is the elimination of these liquid contaminants which presents the most difficult cleaning problem, and the present invention has solved that problem as now described.

A pump 44 and line 45 deliver the accepted stock from the fines remover 42 to a centrifugal flotation unit 50, which is shown somewhat schematically as of truncated conical configuration, provided with a tangential inlet port 51, an apex outlet port 52 and a base or top outlet port 53. The unit 50 is in effect a centrifugal cleaner of special configuration and mode of operation which result in separation of the incoming slurry into an outer fraction containing the majority of the cellulose fiber material, and an inner fraction containing the majority of the grease and greasy fibers, as well as much of any light particulate contaminant materials, including the synthetic fibers. Further, the unit 50 is caused to operate in such manner that the outer fraction is discharged through the apex outlet port 52 as accepted material, while the fraction containing the greasy contaminants is discharged through the top outlet port 53 as reject.

These operating conditions and results are obtained by so proportioning the several ports and so controlling the feed and pressure that the two fractions discharged through the respective ports 52 and 53 are approximately equal in volume and the pressure drop is substantially greater than in a conventional centrifugal cleaner. As a specific example, satisfactory results in the practice of the invention have been obtained using, as the unit 50, a vortex cleaner of 3-inch diameter in which the inlet port 51 and top outlet port 53 are each ½ inch in diameter, as is conventional, but in which the apex outlet port 52 is 9/16 inch in diameter, as compared with a conventional size of ⅓ inch in diameter for this port and a correspondingly small percentage (less than 5 percent and usually closer to 1 percent) of the total volumetric flow therethrough.

The recommended pressure drop for a 3-inch cleaner for conventional centrifugal cleaning purposes is 35–45 psig at 22 gallons per minute through-flow. In contrast, preferred results in the practice of the invention have been obtained with the feed pressure and supply flow sufficiently higher to produce approximately equal volumetric flows through both outlet ports 52 and 53 and a pressure drop at least equal to and preferably somewhat greater than for conventional operations, for example 60–80 psig.

Test results obtained by operating a system as just descrbed show that the flow from the apex outlet 52 will include as much as 80–90 percent of the solids content originally contained in the incoming slurry, and that these solids will comprise primarily the fibers of good reusable quality and only minor amounts of solid contaminants, primarily particles of organic dirt such as plastic fibers and asphaltic materials. The other flow discharged from the unit 50 through the top port 53 will contain only 10 to 20 percent of the original non-aqueous materials, but these materials will comprise the majority of the grease which was present in the incoming stock as well as fines, hair, waxes, synthetic fibers and other non-uniform particles. The further handling of this reject material from the line 55 is described hereinafter.

The values given above in connection with the use of the unit 50 provide typical suitable operating conditions for the practice of the invention, but there is some latitude in these values, and it should also be noted that the consistency of the slurry supplied to the unit 50 is an important factor. In particular, tests indicate that the lower the consistency, the more effective will be the desired separation, and the best results have been obtained at consistencies at the low end of the range of 0.3–0.7 percent.

Another important controlling factor is the ratio of the flow areas of the inlet port 51 to the apex outlet port 52. On a relatively small cleaner such as the 3-inch unit described, this ratio should be at least 1:1 for maximum yield, but need not be substantially greater. Thus the outlet 52 may have a diameter in the range of ½ inch to 9/16 inch when the inlet ports is ½ inch in diameter. For a larger cleaner, such for example as one which is 6 inches in diameter, this ratio should be in the range of 1:1 to 1:1.5.

In general, this ratio should be such for maximum yield that the volumetric flows through the two outlet ports should be approximately equal, but the larger the cleaner, the greater should be the pressure drop, as compared with conventional operating pressures for vortex cleaners, in order to generate centrifugal force conditions equivalent to those used for conventional centrifugal cleaning operations. For example, while a 6-inch centrifugal cleaner will operate conventionally with a 40 psi pressure drop, and a 3-inch centrifugal flotation unit will operate with a pressure drop in the range of 40–100 psi, a pressure drop of at least 80 psi is needed for a 6-inch centrifugal flotation unit, and higher pressures in the range of 80–200 psi are desirable.

The conditions outlined above have been found most satisfactory for obtaining the maximum yield of fibers of acceptable quality, but the centrifugal flotation unit 50 can also be caused to operate with a considerable degree of selectivity which will result in smaller accepted fractions containing fibers of the maximum available lengths. For example, if the flow through the apex outlet 52 is reduced to the range of 20–35 percent of the supply flow, that fraction will contain the majority of the longest fibers which were present in the supply flow to the unit and will be correspondingly more free of fines and light contaminant materials. Thus if the diameter of outlet 52 is reduced to 7/16 inch from 9/16 inch, the flow therethrough is reduced from approximately 50 percent to approximately 25 percent, and the amount of fiber removed as reject through the base outlet 53 is increased from approximately 12 percent to approximately 25 percent.

It will be noted that in the preceding example, the reduction in size of the outlet 52 is in the ratio of 8:5, but the effective flow area of the outlet will still be more than twelve times that of the apex outlet in a conventional cleaner of the same size. It will also be apparent that similar results can be obtained without changing the actual size of the outlet 52 by increasing the back pressure thereon, as by a suitable throttling valve 56 in the line 57 from outlet 52. In general, it can be stated that a fiber yield of the highest quality is obtained from a centrifugal flotation unit by increasing the pressure drop, reducing the accepted volume, and operating at very low consistencies such as 0.3 percent but this yield will correspondingly be reduced to the extent that the reject fraction is increased. The most satisfactory results thus far have been obtained with a 3-inch unit as described above, and the above disclosure with respect to the ratio of the inlet port to the apex port can be appropriately restated for a 3-inch unit as a ratio in the range of 1:0.75 to 1:1.25 depending upon the desired volume and quality of yield of accepted fibers.

It will be apparent that the separation of the light contaminant particles from the paper making fibers by this treatment might have been predicted from the British patent noted above. The separation of the grease and greasy fibers, however, was unexpected, and the correct scientific explanation for this phenomenon is uncertain. It may be that whenever separate globules of grease are present act like solid particles of similar specific gravity and dimensions, but this would not necessarily explain the behavior of grease-impregnated paper fibers. Perhaps what occurs is a transformation of such fibers causing them to behave hydrodynamically like light reject particles of other materials even though they do not differ significantly in specific gravity from grease-free fibers. The ultimate fact remains that the invention produces results never before attained in the recovery of good quality paper making fibers from municipal waste.

The accepted material from the unit 50, which exits through the apex outlet 52, will ordinarily need additional treatment or treatments, depending upon the use to which it will ultimately be put. It is accordingly shown as delivered by the line 56 to further treatment stations. For example, if the accepted material from the unit 50 still contains any significant amount of fine gritty materials or fine particles of organic dirt, it can be subjected to a further centrifugal cleaning step, in which case the station 60 represents an additional supply pump and cleaner like the pump 31 and cleaner 33 and used in addition to or in place of the pump 39 and cleaner 40.

Another possible further treatment is digestion, especially if the fiber slurry contains hard-to-eliminate contaminants like grease, wax and asphalt, which can readily be dispersed by digestion, and in any event if the fiber is to be bleached. The station 61 accordingly represents a digester, and satisfactory results can be obtained with any conventional digester, using NaOH as chemical in concentrations of 1–15 percent by weight, pressure and temperature conditions range from 10 psi and 239°F to 100 psi and 338°F and times of 5–15 minutes. It will be understood that a suitable dewatering device should be used ahead of the digester, which can handle consistencies as high as 45 percent as compared with the 0.6–1.0 percent at which the accepted stock leaves the flotation unit 50, and the station 62 represents a final stage of washing and dewatering apparatus for the digested stock.

It should be noted that there are significant advantages in performing the digesting step just described following the step of centrifugal flotation rather than preceding it. For example, digestion tends to reduce the particle size of some of the light contaminants, particularly the synthetic fibers, and thereby makes them more difficult to eliminate than while they are of larger particle size. Additionally, elimination of the majority of the grease by centrifugal flotation has the result that less chemical is required for a subsequent digesting step than if the grease were still present.

Figure 2:
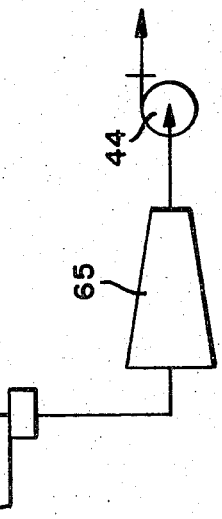
FIG. 2 is a fragmentary view illustrating a modification of the system of FIG. 1.

Depending upon the amount of greasy material present in the slurry, it may be advantageous to the practice of the invention to include a preliminary step having the purpose of loosening the grease from the fibers before the slurry is subjected to centrifugal flotation. For example, a soap, detergent or other dispersing agent for grease may be added to the slurry. Alternatively, or additionally, the slurry may be subjected to a mechanical action which tends to loosen grease from fibers or papermaking agencies, for example in a disk refiner or deflaker. FIG. 2 represents a fragment of the system of FIG. 1 modified to provide such a further treatment station 65 between the fines remover 42 and the flotation unit 50, which is the preferred location for this refining and/or grease-dispersing station.

The complete system as described thus far appears to be preferred, but it is subject to considerable modification within the scope of the invention. For example, because the centrifugal flotation unit 50 is quite effective as a fines remover, the fines being separated into the fraction discharged through the base outlet 53, it is possible to eliminate the fines remover 42 and to connect thee line 41 directly to the pump 44. Similarly, the number of centrifugal cleaning stations 33 and 40 is primarily a matter of choice dictated by the amount of fine inorganic and organic dirt particles which remain after the initial treatments at the cyclone 20 and screening stations 25 and 30.

In a further modification of the system as shown in FIG. 1, it is possible to replace one or both of the screens 25 and 30 with a centrifugal flotation unit, which can perform essentially the same screening function because the majority of the contaminants removed by screening are large particles of low specific gravity materials such as plastic, wax paper, wood, corn husks, leaves and the like. For example, a 6-inch centrifugal flotation unit will serve satisfactorily at the coarse screening station 25 and can be followed by a 3-inch centrifugal flotation unit for fine screening, or by a conventional fine screen. A particular advantage flowing from the use of centrifugal flotation units for screening is that the proportion of paper fiber which they reject is considerably lower than with conventional screens, thereby providing a higher yield of fiber in the accepted stock. After cleaning by one or more centrifugal cleaners 33 and 40, the accepted material is supplied to the centrifugal flotation unit 50 as already described. All such modified systems and sequences can also be further modified by addition of one or both of the refining and grease-dispersing stations.

As already noted, the differences between the preferred consistencies at which each step is performed will require dilution of dewatering stations at various positions in the system, and it is deemed that a showing of such stations is unnecessary to those skilled in the art. It will be helpful, however, to supplement the above disclosures with respect to consistency by listing the preferred value for each step: 3.5 percent at the cyclone 20 and coarse screen 25, 1 percent at the fine screen 30, 0.7 percent at the cleaner 33, 0.5 percent at the cleaner 40, 0.3 percent at the fines remover 42, 0.5 percent at the centrifugal flotation unit 50 and 35 percent at the digester 61.

It should also be noted that both the fines remover and the centrifugal flotation unit have dewatering actions on the accepted material therefrom. For example, if the stock enters the fines remover at 0.3 percent, the accepted material is dewatered to approximately 3.5 percent. In the centrifugal flotation unit, the consistency of the accepted material is approximately twice the input consistency, while the consistency of the reject material from the base outlet is about half the input value.

As already noted, greases may constitute as much as 5 percent of the non-aqueous constituents of municipal refuse, and they constitute an even larger proportion of the reject from the flotation unit 50, namely in the range of 20–35 percent. This reject material can be combined with the rejects from the earlier cleaning and screening stations for incineration in a fluid bed reactor or similar final disposal station, but it is also feasible to recover the solvent-soluble portion for other uses, such for example as a raw material for the production of soap or fuel. In fact, because the reject from the unit 50 is virtually entirely organic in nature, the major components other than grease and wax being natural or synthetic in origin such as plastics and vegetation, and because it is also of relatively uniform particle size small enough to have been accepted by the fine screen 30, all of the reject is admirably suited for conversion to fuel by pyrolysis or hydrogenation in accordance with the disclosure of Marsh U.S. Pat. No. 3,714,038. The station 70 in FIG. 1 accordingly represents such treatment.

As an alternate to using all of the reject from the flotation unit 50 as a fuel source, the solvent-soluble portion can be recovered separately by conventional treatments such as an initial flotation-clarifying step followed by distillation or a chemical recovery step utilizing a suitable solvent. The station 70 in FIG. 1 is accordingly also representative of such selective recovery stations. The residue after removal of the solvent-soluble portion comprises predominately paper fiber fines capable of passage through a 100-mesh screen and therefore essentially of no value for paper making purposes, these fines usually constituting in the range of 60–70 percent of the reject material from the flotation unit 50. It will therefore ordinarily be most practical to dispose of this residue by incineration, except as noted in the following paragraph.

If flotation units are used as screens at the stations 25 and 30 of FIG. 1 as noted above, the reject material therefrom will resemble the reject material from the flotation unit to the extent that it is primarily organic in nature and also has a relatively low proportion of reusable paper fibers. In addition, it will have a substantial proportion of plastic and other organic material including the solvent-soluble contaminants. It is therefore well suited for use as raw material for conversion to fuel, whether or not the solvent-soluble portion is first recovered therefrom, and if the system is arranged to handle the reject in this manner, it is usually feasible to combine with it the reject from the flotation unit 50, particularly if the solvent-soluble fraction is first removed from that material.

While the processes herein described constitute preferred embodiments of the invention, it is to be understood that the invention is not limited to these precise processes, and that changes may be made therein without departing from the scope of the invention which is defined in the appended claims.

What is claimed is:

1. The process of recovering by-products, including paper fibers for reuse from refuse containing waste paper contaminated by garbage, comprising the steps of:

a. forming from said refuse a pumpable aqueous slurry wherein the solid constituents are of a maximum particle size of the order of paper fibers and consist essentially of paper fibers contaminated with greasy liquids, b. supplying said slurry to a conical vessel having a tangentially arranged inlet port adjacent the base thereof and having outlet ports in the apex and base thereof, said inlet and base ports being of the same order of flow area, c. maintaining the supply flow to said inlet port sufficiently high to develop in said vessel centrifugal force conditions causing vortical separation of said slurry within said vessel into an outer fraction containing the large majority of the paper fibers and an inner fraction containing the large majority of said greasy liquids and to cause discharge flows of said outer and inner fractions through said apex and base ports respectively, d. maintaining said discharge flows through both of said outlet ports in predetermined relation such that the portion of said outer fraction discharged through said apex port as accepted stock contains the large majority of the paper fibers which enter said vessel, e. recovering for reuse the reject materials in such discharge flow through said base outlet, and f. further treating said recovered reject materials to convert the same into one or more of the following by-products:
  i. the grease constituents thereof,
  ii. fuel including said grease constituents,
  iii. fuel substantially free of said grease constituents.

2. The process defined in claim 1 wherein the ratio of the effective flow area of said inlet port to said apex port is the range of 1:0.75 to 1:1.25.

3. The process as defined in claim 1 wherein all of said ports are of substantially the same effective flow area, and the discharge flows through said outlet ports are substantially equal.

4. The process as defined in claim 1 comprising the further step of subjecting said accepted stock to digestion.

5. The process as defined in claim 1 comprising the step of subjecting said slurry to a refining treatment prior to said supplying step (b) of claim 1 to effect loosening of grease from the paper fibers.

6. The process as defined in claim 1 comprising the step of mixing a grease dispersing agent with said slurry prior to said supplying step (b) of claim 1.

7. The process as defined in claim 1 wherein said vessel is approximately 3 inches in diameter, each of said ports has the flow area of a circle approximately ½ inch in diameter, and the pressure drop within said vessel is at least as high as in the range of 40–60 psi.

8. The process as defined in claim 1 wherein said pumpable slurry is formed by the successive preliminary steps of:
  i. producing a slurry comprising water, paper fibers, garbage, and at least some of the following contaminant materials:
    frangible and infrangible inorganics,
    vegetation residues,
    insoluble inorganics,
    grit and other dirt,
  ii. centrifugally cleaning said slurry to remove the majority of said inorganics therefrom, and
  iii. thereafter carrying out steps (b), (c) and (d) of claim 1.

9. The process as defined in claim 8 comprising the further step of subjecting said accepted stock to digestion.

10. The process as defined in claim 8 comprising carrying out the steps defined below between steps (ii) and (iii) defined in claim 8:
  i. Subjecting said cleaned slurry to screening effective to remove therefrom large particles comparable in specific gravity to paper fibers,
  ii. centrifugally cleaning said screened slurry to remove high specific gravity particles therefrom, and
  iii. removing a substantial portion of fine fibers from said screened and cleaned slurry.

11. The process as defined in claim 10 comprising the additional step of combining the reject materials produced by each of said steps (i) and (iii) with said reject materials from step (e), and wherein said further treating step (f) comprises converting said combined reject materials to fuel.

12. The process as defined in claim 10 wherein said further treating step comprises separating said grease constituents from the remainder of said reject materials, and said process comprising the additional steps of combining the reject materials produced by each of said steps (i) and (iii) with said remainder of said reject materials, and converting said combined reject materials to fuel.

13. The process as defined in claim 1 wherein said further treating step comprises separating said grease constituents from the remainder of said reject materials.

14. The process as defined in claim 13 comprising the further step of converting said remainder of said reject materials to fuel.

15. The process as defined in claim 1 wherein said further treating step comprises converting substantially all of said reject materials to fuel.

* * * * *